US012747166B2

(12) United States Patent
Takabatake et al.

(10) Patent No.: US 12,747,166 B2
(45) Date of Patent: Sep. 29, 2026

(54) COMPOSITE METAL OXIDE

(71) Applicant: SETOLAS Holdings, Inc., Takamatsu (JP)

(72) Inventors: Harumi Takabatake, Sakaide (JP); Hikaru Ando, Sakaide (JP); Yoshihito Iwamoto, Sakaide (JP)

(73) Assignee: SETOLAS HOLDINGS, INC., Takamatsu (JP)

( * ) Notice: Subject to any disclaimer, the term of this patent is extended or adjusted under 35 U.S.C. 154(b) by 400 days.

(21) Appl. No.: 18/289,089

(22) PCT Filed: May 12, 2023

(86) PCT No.: PCT/JP2023/017979
§ 371 (c)(1),
(2) Date: Oct. 31, 2023

(87) PCT Pub. No.: WO2023/233971
PCT Pub. Date: Dec. 7, 2023

(65) Prior Publication Data

US 2025/0083976 A1 Mar. 13, 2025

(30) Foreign Application Priority Data

May 31, 2022 (JP) ................................ 2022-088906

(51) Int. Cl.
*C02F 1/28* (2023.01)
*B01J 20/08* (2006.01)
*B01J 20/28* (2006.01)
*B01J 20/30* (2006.01)

(52) U.S. Cl.
CPC ............... *C02F 1/288* (2013.01); *B01J 20/08* (2013.01); *B01J 20/28061* (2013.01); *B01J 20/3021* (2013.01); *B01J 20/3078* (2013.01); *B01J 20/3085* (2013.01); *C02F 1/281* (2013.01)

(58) Field of Classification Search
CPC ............ C02F 1/288; C02F 1/281; C02F 1/28; C01F 7/16; C01F 7/162; B01J 20/08; B01J 20/041; B01J 20/04; B01J 20/28061; B01J 20/3078
See application file for complete search history.

(56) References Cited

FOREIGN PATENT DOCUMENTS

| | | | | |
|---|---|---|---|---|
| CN | 107661742 | * | 2/2018 | .............. B01J 20/18 |
| JP | 2002-136965 A | | 5/2002 | |
| TW | 202132221 A | | 9/2021 | |

OTHER PUBLICATIONS

CN 107661742 and English translation (Year: 2018).*
Kameda et al., "hydrotalcite Application to water environment conservation and purification", The Chemical Times, 2005, vol. 195, No. 1, p. 10-16.

* cited by examiner

*Primary Examiner* — Benjamin M Kurtz
(74) *Attorney, Agent, or Firm* — Birch, Stewart, Kolasch & Birch, LLP

(57) ABSTRACT

The invention provides a composite metal oxide with excellent anion adsorption, which can remove multiple different anions each with a high adsorption rate for removal. Disclosed is a composite metal oxide represented by formula (1). The composite metal oxide has a solid base content of 3.70 mmol/g or higher.

$$(Mg_{1-x}Al_x)O_{1+x/2} \quad (1)$$

In formula (1), x is a number satisfying the inequality $0.18 \leq x \leq 0.45$.

7 Claims, No Drawings

COMPOSITE METAL OXIDE

FIELD

The present invention relates to a composite metal oxide to be used for treatment of water.

BACKGROUND

Water treatment technology has mainly been developed for use in water treatment, sewage treatment or waste water treatment, and is generally divided into biological treatment and physicochemical treatment. Biological treatment involves methods of decomposing contaminants by the action of microorganisms. Physicochemical treatment, on the other hand, involves different treatment methods depending on the state of the contaminants in the water.

When the contaminants are suspended solids or colloid substances, for example, the contaminants are usually separated and removed by precipitation processing and filtration processing. When the contaminants are fine suspended solids or colloid substances that cannot be removed by separation, however, the separating removal is accomplished by insolubilization with a flocculating agent.

When the contaminants are soluble substances in drinking water or industrial waste water, the contaminants are removed by means such as electrodialysis, reverse osmosis, evaporation, ion-exchange or adsorption methods. However, electrodialysis, reverse osmosis and evaporation methods incur high equipment costs, and are also limited in the locations where they can be implemented. Ion-exchange methods using ion exchange resins can be carried out with relatively inexpensive equipment, but also use high-concentration aqueous alkali solutions for regenerating treatment, which increases the cost for regenerating treatment. For these reasons, increasing efforts have been focused on adsorption methods which allow contaminants in water to be removed with relatively inexpensive equipment and treatment costs.

PTL 1, for example, discloses a waste water treatment method using an adsorption method, wherein a composite metal oxide represented by a specific chemical formula and having a rock salt structure is contacted with waste water containing anions such as chloride ion, thereby fixing the anions in the composite metal oxide.

NPL 1 discloses a water purification method wherein anions such as phosphate ion or chloride ion in water are removed using hydrotalcite (HT) or magnesium-aluminum oxide (Mg—Al oxide).

CITATION LIST

Patent Literature

[PTL 1] Japanese Unexamined Patent Publication No. 2002-136965

Non Patent Literature

[NPL 1] Kameda, T., Yoshioka, T., Umetsu, Y., Okuwaki, A., "Application of hydrotalcite for water conservation and purification", The Chemical Times 2005 No. 1 (Vol 195), pp. 10-16.

SUMMARY

Technical Problem

Water such as drinking water and industrial waste water often includes multiple different anions. With conventional composite metal oxides, however, it has been difficult in practice to simultaneously remove multiple different anions with high removal rates for each anion, making it necessary to carry out treatment of the same water several times.

It is therefore an object of the present invention to provide a composite metal oxide with excellent anion adsorption, which can remove multiple different anions each with a high adsorption rate for removal.

Solution to Problem

As a result of much intense research with the aim of achieving this object, the present inventors have found that by using a specific composite metal oxide represented by the following formula (1) and with a high solid base content, for treatment of water, it is possible to remove at least four different anions, each at a high adsorption rate. The present invention has been completed based on this finding and includes the following aspects.

First Disclosure

The first disclosure is a composite metal oxide represented by the following formula (1). The composite metal oxide has a solid base content of 3.70 mmol/g or higher.

$$(Mg_{1-x}Al_x)O_{1+x/2} \tag{1}$$

[In formula (1), x is a number satisfying the inequality $0.18 \leq x \leq 0.45$.]

Second Disclosure

The second disclosure is the above first disclosure wherein the BET specific surface area is in the range of 150 $m^2/g$ to 350 $m^2/g$.

Third Disclosure

The third disclosure is a mixture that includes a composite metal oxide of the above first disclosure or second disclosure, and a layered double hydroxide.

Fourth Disclosure

The fourth disclosure is the above third disclosure wherein the layered double hydroxide is a layered double hydroxide represented by the following formula (2).

$$[Mg_{1-x}Al_x(OH)_2]^{x+}\left[(A^{n-})_{x/n} \cdot mH_2O\right] \tag{2}$$

[In formula (2), $A^{n-}$ represents an anion selected from the group consisting of $CO_3^{2-}$ and $OH^-$, n represents 1 or 2, x is a number satisfying the inequality $0.18 \leq x \leq 0.45$, and m is a number satisfying the inequality $0 \leq m < 1$.]

Fifth Disclosure

The fifth disclosure is the above third disclosure or fourth disclosure wherein the mixing ratio of the composite metal oxide and layered double hydroxide is in the range of 99.99:0.01 to 50:50, as mass ratio.

Sixth Disclosure

The sixth disclosure is an adsorbent that includes a composite metal oxide of the above first disclosure or second disclosure.

Seventh Disclosure

The seventh disclosure is a method of treating a liquid that includes contacting the liquid with a composite metal oxide of the above first disclosure or second disclosure.

Eighth Disclosure

The eighth disclosure is an adsorbent that includes a mixture of any one of the above third disclosure to fifth disclosure.

Ninth Disclosure

The ninth disclosure is a method of treating a liquid that includes contacting the liquid with a mixture of any one of the above third disclosure to fifth disclosure.

Tenth Disclosure

The tenth disclosure is a method of treating a liquid that includes contacting the liquid with an adsorbent of the above sixth disclosure.

Advantageous Effects of Invention

The composite metal oxide of the invention is able to remove at least four different anions, each at a high adsorption rate. The composite metal oxide of the invention can efficiently adsorb and remove not only monatomic anions but also polyatomic oxoanions or transition metal oxoanions.

DESCRIPTION OF EMBODIMENTS

Preferred embodiments of the composite metal oxide of the invention will now be explained in detail. Unless otherwise specified, the numerical ranges used herein are ranges that include the upper and lower limits.

[Composite Metal Oxide]

According to one embodiment of the invention, the composite metal oxide is a composite metal oxide represented by the following formula (1). The composite metal oxide has a solid base content of 3.70 mmol/g or higher.

$$(Mg_{1-x}Al_x)O_{1+x/2} \quad (1)$$

[In formula (1), x is a number satisfying the inequality $0.18 \leq x \leq 0.45$.]

The composite metal oxide can be obtained, for example, by burning a hydrotalcite compound under predetermined conditions. Specifically, when a hydrotalcite compound is burned under predetermined conditions, the carbonate ions between the layers of the hydrotalcite compound dissociate from the hydroxyl groups bonded to the water of crystallization and metal ions, forming composite metal oxides.

The hydrotalcite compound serving as the starting material for the composite metal oxide can be synthesized in the following manner, for example. First, a mixed aqueous solution of a magnesium salt and an aluminum salt is reacted with an alkaline substance to obtain a slurry. The obtained slurry may be subjected to hydrothermal treatment to cause crystal growth. The slurry may then be subjected to various steps including solid-liquid separation, water washing, drying and pulverizing, to obtain a powder of the hydrotalcite compound.

Magnesium salts to be used for synthesis of the hydrotalcite compound are not particularly restricted, and examples include magnesium chloride, magnesium nitrate, magnesium sulfate and magnesium hydroxide. The magnesium salt used is most preferably one or more from among magnesium sulfate and magnesium chloride. These magnesium salts have the advantage of reducing material cost while also being readily available.

Aluminum salts to be used for synthesis of the hydrotalcite compound are not particularly restricted, and examples include aluminum chloride, aluminum nitrate, aluminum sulfate and sodium aluminate. The molar ratio of $Mg/Al_2$ in a mixed aqueous solution of a magnesium salt and aluminum salt is preferably in the range of 2 to 10 and more preferably in the range of 4 to 8.

Alkaline substances to be used for synthesis of the hydrotalcite compound are not particularly restricted, and examples include aqueous solutions of caustic soda, ammonia, potassium hydroxide and sodium carbonate.

A composite metal oxide obtained from such hydrotalcite compounds can take up ions and moisture from the atmosphere, thus easily reconstituting a hydrotalcite-like structure. Moreover, because the composite metal oxide is positively charged, it can easily adsorb anions such as fluoride ions and chloride ions. When taking in moisture from the atmosphere and being converted to a hydroxide, the composite metal oxide may also take up anions between the layers (intercalation).

The composite metal oxide of the embodiment has a solid base content of 3.70 mmol/g or higher. The composite metal oxide of the embodiment, being represented by formula (1) above and having the specified solid base content, can remove at least 4 different anions, each at a high adsorption rate. Specifically, the composite metal oxide of the embodiment can remove anions containing fluorine, boron, chromium and phosphorus elements, each at a high adsorption rate. The composite metal oxide can also efficiently adsorb and remove not only monatomic anions but also polyatomic oxoanions or transition metal oxoanions. As a result, the composite metal oxide of the embodiment can significantly contribute to purification of water, and can aid in efforts to achieve the SDGs (Sustainable Development Goals) adopted by the United Nations.

The upper limit for the solid base content of the composite metal oxide is not particularly restricted but may be 20 mmol/g, and is preferably 10 mmol/g. The specific method for measuring the solid base content is described below.

The solid base content of the composite metal oxide can be controlled by appropriately adjusting the thermal history during production of the composite metal oxide. A specific example of thermal history would include the burning conditions for burning of the hydrotalcite compound, such as the temperature increase time, the holding temperature, the holding time and the temperature decrease time. Burning of the hydrotalcite compound will generally take place by a series of steps in which the temperature is increased from room temperature and held for a certain time at a holding temperature, and the temperature is decreased back to room temperature.

The terms relating to burning of the hydrotalcite compound (sample) used throughout the present specification are as follows.

Temperature increase time: The time for heating from room temperature until reaching the target maximum temperature during burning of the sample in an electric furnace.

Holding temperature: The target maximum temperature during burning of the sample in an electric furnace. This is also referred to as the "burning temperature".

Holding time: The time for which the holding temperature is maintained during burning of the sample in an electric furnace.

Temperature decrease time: The time for cooling from the holding temperature after the holding time has elapsed until reaching room temperature, during burning of the sample in an electric furnace. Cooling includes active cooling using cooling means, as well as gentle cooling by standing.

The burning conditions for production of the composite metal oxide from the hydrotalcite compound are not particularly restricted so long as a solid base content is obtained within the above specified range. Examples of such burning conditions include a temperature increase time of preferably 0.5 hour to 8 hours and more preferably 0.5 hour to 6 hours. Likewise, the holding temperature is preferably 350° C. to 900° C. and more preferably 400° C. to 850° C. The holding time is preferably 0 hours to 18 hours and more preferably 0 hours to 15 hours. The temperature decrease time is preferably 0.5 hour to 4 hours and more preferably 0.8 hour to 3 hours.

The composite metal oxide of the invention preferably has a BET specific surface area in the range of 150 $m^2/g$ to 350 $m^2/g$. If the BET specific surface area is within such this range it will be possible to even more reliably exhibit high adsorption for multiple different anions.

As used herein, the "BET specific surface area" refers to the specific surface area of the particulate composite metal oxide as determined by the BET method. The specific method for measuring the BET specific surface area is described below.

The BET specific surface area of the composite metal oxide is preferably in the range of 150 $m^2/g$ to 300 $m^2/g$ and more preferably in the range of 155 $m^2/g$ to 260 $m^2/g$.

The composite metal oxide of the invention can be suitably used as an adsorbent for removal of multiple different anions present in water such as drinking water or industrial waste water, for example. In this case, so long as it includes the composite metal oxide of the invention, the adsorbent may either include the composite metal oxide of the invention alone, or it may include other components in addition. For example, a mixture including the composite metal oxide of the invention and a layered double hydroxide may be used as the adsorbent. That is, one aspect of the invention is a mixture comprising a composite metal oxide of the invention and a layered double hydroxide. Since a layered double hydroxide has low bulk, the mixture comprising the composite metal oxide and the layered double hydroxide has lower bulk than an adsorbent consisting of a composite metal oxide alone. Such a mixture has therefore good handling properties when actually used as an adsorbent.

The layered double hydroxide in the above mixture is not particularly restricted, and it may be a double hydroxide represented by the following formula (2), for example.

$$[Mg_{1-x}Al_x(OH)_2]^{x+}\left[(A^{n-})_{x/n}\cdot mH_2O\right] \quad (2)$$

[In formula (2), $A^{n-}$ represents an anion selected from the group consisting of $CO_3^{2-}$ and $OH^-$, n represents 1 or 2, x is a number satisfying the inequality $0.18 \le x \le 0.45$, and m is a number satisfying the inequality $0 \le m < 1$.]

The layered double hydroxide represented by formula (2) is not particularly restricted and may be the hydrotalcite compound used as the starting material for the composite metal oxide, or a composite metal oxide hygroscopic material. These layered double hydroxides have the advantage of reducing material cost while also being readily available.

The mixing ratio of the composite metal oxide and the layered double hydroxide in the mixture is not particularly restricted so long as the effect of the invention is not inhibited, but it is preferably in the range of 99.99:0.01 to 50:50 as the composite metal oxide:layered double hydroxide mass ratio. If the mixing ratio is within such this range it will be possible to maintain high adsorption for multiple different anions, while more reliably providing satisfactory handleability when the adsorbent is used.

[Treatment Method]

The composite metal oxide of the invention can also be used as an adsorbent for removal of multiple different anions present in liquids other than water, or in gases. From the viewpoint of removing multiple different anions each at a high adsorption rate, however, the composite metal oxide of the invention is preferably used as an adsorbent for a liquid containing water or a non-water liquid.

One aspect of the invention, therefore, is a method for treating a liquid which includes contacting a composite metal oxide of the invention with a liquid containing water or a non-water liquid. With this method for treating a liquid it is possible to remove multiple different anions from the liquid, each at a high adsorption rate.

The composite metal oxide of the invention may also be used as an adsorbent for a liquid containing water or a non-water liquid in the form of a mixture with the above layered double hydroxide. Another aspect of the invention, therefore, is a method for treating a liquid which includes contacting a mixture of a composite metal oxide of the invention and the above layered double hydroxide, with a liquid containing water or a non-water liquid.

The composite metal oxide of the invention may be molded as suitable for the purpose of use. In other words, one aspect of the invention is a molded article of a composite metal oxide of the invention. Specifically, the molded article can be obtained by granulating or casting the powdered composite metal oxide into a shape suitable for carrying out adsorption treatment. The shape of the molded article may be spherical, approximately spherical, cylindrical, granular, pelletized or tablets, for example.

The granulation method or molding method for production of the molded article is not particularly restricted, and any publicly known method such as dry granulation or wet granulation may be employed. Examples of dry granulation methods include the dry roller compactor method and the roll granulator method. Examples of wet granulation methods include the spray dry method, fluidized bed granulation method, rolling granulation method, stirring granulation method and extrusion granulation method. The molded article including the composite metal oxide of the invention allows control of the permeability and adsorption effect for the liquid or gas comprising the substance to be adsorbed during the process of adsorption.

The composite metal oxide of the invention can be granulated or molded with addition of any of various publicly known additives. In other words, one aspect of the invention is an additive-containing molded article.

Examples of additives include fibers, resins and clay minerals. Examples of fibers include chemical fibers, regenerated fibers and natural fibers. Cellulose is an example of a natural fiber. Examples of clay minerals include bentonite, sepiolite and kaolin. The additive-containing molded article containing a composite metal oxide of the invention allows the strength and void percentage of the molded article to be controlled, thus allowing control of adsorption performance.

The composite metal oxide of the invention can be applied for a wide range of purposes, such as the following.

One aspect of the invention is a liquid purifying material. One specific example of a liquid purifying material is a liquid purifying material comprising a composite metal oxide of the invention, and a bag housing the composite metal oxide and having pores of a size preventing permeation of the composite metal oxide. The material of the bag may be a nonwoven fabric, for example. A liquid purifying material that includes the composite metal oxide of the invention will facilitate separation of the liquid and the liquid purifying material after the liquid and the liquid purifying material have been contacted.

One aspect of the invention is filtration device. A specific example of a filtration device is one having powder and/or a molded article composed of the composite metal oxide of the invention packed or provided as a filtration bed in a tubular body. Another specific example is a packed column having the composite metal oxide of the invention packed in the column body.

Another aspect of the invention is composite fibers. A specific example of composite fibers is composite fibers having the composite metal oxide of the invention supported on fibers. The fibers may be at least one type of fiber selected from among chemical fibers, regenerated fibers and natural fibers. Cellulose is an example of a natural fiber. The means for supporting the composite metal oxide on the fibers is not particularly restricted, and the composite metal oxide may be kneaded into the fiber interiors during production of the fibers, or the composite metal oxide may be adhered onto the fiber surfaces using a treatment agent.

The composite metal oxide of the invention may also be used as a resin stabilizer. In other words, one aspect of the invention is a resin composition comprising a composite metal oxide of the invention. Since the composite metal oxide of the invention removes interlayer water by burning of a hydrotalcite compound, the amount of water generation is low even with addition to a resin and heating. As a result, a resin composition comprising the composite metal oxide of the invention can reduce foaming during thermal processing more than a resin composition to which a hydrotalcite compound has been added.

The invention is not restricted to the embodiments described above or the Examples described below, and can incorporate appropriate combinations, substitutions and modifications within a range that is not outside of the object and gist of the invention.

EXAMPLES

The invention will now be explained in greater detail using Examples and Comparative Examples, with the understanding that the invention is not limited only to these Examples.

The measuring methods used in the Examples are as follows.

<Molar Ratio ($MgO/Al_2O_3$)>

The molar ratio was measured by the following acid dissolution method. Samples that did not dissolve by the acid dissolution method were measured by the alkali melting method described below.

(Acid Dissolution Method)

After placing 0.5 g of sample in a 100 mL beaker, 10 mL of dilute hydrochloric acid and 5 mL of perchloric acid were added and the mixture was heated to dissolution on a hot plate. The sample solution in the beaker was transferred to a 250 mL graduated flask and diluted to 250 mL. The diluted sample solution was used to measure the MgO content and $Al_2O_3$ content in the following manner.

(1) MgO Quantitation

A 10 mL portion of the above sample solution was taken into a 200 mL beaker using a whole pipette, and then diluted to 100 mL with ion-exchanged water. To the diluted sample solution there was added 5 mL of an aqueous triethanolamine solution, and then ammonium chloride-ammonia buffer was added dropwise until the pH meter registered pH=10. After adding 15 drops of universal BT reagent as an indicator, titration was performed with 0.01 mol/L-EDTA standard solution.

(2) $Al_2O_3$ Quantitation

A 10 mL portion of the above sample solution was taken into a 200 mL beaker using a whole pipette, and 30 mL of 0.01 mol/L-CyDTA standard solution was added using a whole pipette. Hexamethylenetetramine was added until the pH meter registered pH=5 to 5.5. Three drops of XO reagent was added as an indicator, and then titration was performed with 0.01 mol/L zinc acetate standard solution.

The quantified MgO and $Al_2O_3$ contents as above were used to calculate the molar ratio ($MgO/Al_2O_3$).

(Alkali Melting Method)

After placing 0.5 g of sample in a platinum crucible, 3 g of boric acid and 5 g of sodium carbonate were added and the mixture was melted in an electric furnace for 2 hours at 950° C. The melt was transferred to a 200 mL beaker, and 100 mL of dilute hydrochloric acid was added to dissolve it. The solution was then transferred to a 250 mL graduated flask and diluted to 250 mL. Quantitation of the MgO content and quantitation of the $Al_2O_3$ content were carried out in the same manner as the acid dissolution method, and the molar ratio was calculated.

<BET Specific Surface Area>

This was measured using a "BELSORP-max" high-precision specific surface area/pore distribution analyzer by Microtrac Bell.

<Solid Base Content>

After placing 0.2 g of sample in a stoppered Erlenmeyer flask, 5 mL of benzene (Wako reagent grade) was added. After then further adding 1 mL of a 0.1 wt % benzene solution of phenolphthalein as an indicator with pKa=9.3, the sample solution exhibited a pink color. Titration was performed with a 0.1 mol/L benzoic acid-benzene solution until the sample solution turned white, and the amount of benzoic acid-benzene solution required for titration was recorded as A (mL). Since the sample solution returned to pink after stoppering the Erlenmeyer flask and allowing it to stand for 24 hours, titration was repeated with a 0.1 mol/L benzoic acid-benzene solution until the sample solution turned white, and the amount of benzoic acid-benzene solution required for titration was recorded as B (mL). This procedure was repeated once more, and the amount of benzoic acid-benzene solution required for titration was recorded as C (mL). The solid base content was calculated from the total of the 3 titrations, based on the following formula.

$$\text{Solid base content (mmol/g)} = 0.1(A+B+C)/0.2\ \text{g}$$

<Adsorption Rates for Different Anions>

The adsorption rates for the multiple different anions in water were measured in the following manner for each anion type and concentration.

(Adsorption Rate for Fluorine (F) with Blank Concentration of 10 ppm)

After adding 0.03 g of sample to a 50 mL-volume centrifuge tube, 30 mL of an aqueous sodium fluoride solution with a fluorine concentration of 10 ppm was added. The centrifuge tube was set in a shaker and shaken for 15 hours at a shaking speed of 160 rpm. The centrifuge tube was set in a centrifugal separator and centrifuged for 5 minutes at 10,000 g. The supernatant liquid was filtered through a membrane filter with a pore size of 0.2 μm. A 10 mL portion of the obtained filtrate was placed in a 20 mL graduated flask, after which 2 mL of Alfusone solution (2.5 g of Alfusone reagent dissolved in 50 mL of ion-exchanged water) and 4 mL of acetone were added, and the mixture was diluted to 20 mL with ion-exchanged water. The diluted filtrate was allowed to stand in a dark environment for 1 hour, and then a U-4100 spectrophotometer by Hitachi High-Tech Science was used for measurement of the fluorine concentration D (ppm) at 620 nm, calculating the adsorption rate based on the following formula.

$$\text{Adsorption rate (\%)} = (10-D)/10\times100$$

(Adsorption Rate for Fluorine (F) with Blank Concentration of 50 ppm)

After adding 0.03 g of sample to a 50 mL-volume centrifuge tube, 30 mL of an aqueous sodium fluoride solution with a fluorine concentration of 50 ppm was added. The centrifuge tube was set in a shaker and shaken for 15 hours at a shaking speed of 160 rpm. The centrifuge tube was set in a centrifugal separator and centrifuged for 5 minutes at 10,000 g. The supernatant liquid was filtered through a membrane filter with a pore size of 0.2 μm. A 10 mL portion of the obtained filtrate was placed in a 20 mL graduated flask, after which 2 mL of Alfusone solution (2.5 g of Alfusone reagent dissolved in 50 mL of ion-exchanged water) and 4 mL of acetone were added, and the mixture was diluted to 20 mL with ion-exchanged water. The diluted filtrate was allowed to stand in a dark environment for 1 hour, and then a U-4100 spectrophotometer by Hitachi High-Tech Science was used for measurement of the fluorine concentration E (ppm) at 620 nm, calculating the adsorption rate based on the following formula.

$$\text{Adsorption rate (\%)} = (50-E)/50\times100$$

(Adsorption Rate for Boron (B) with Blank Concentration of 10 ppm)

After adding 0.03 g of sample to a 50 mL-volume centrifuge tube, 30 mL of an aqueous sodium tetraborate solution with a boron concentration of 10 ppm was added. The centrifuge tube was set in a shaker and shaken for 15 hours at a shaking speed of 160 rpm. The centrifuge tube was set in a centrifugal separator and centrifuged for 5 minutes at 10,000 g. The supernatant liquid was filtered through a membrane filter with a pore size of 0.2 μm. The boron concentration F (ppm) of the obtained filtrate was measured using an SPS3500DD ICP emission spectrometer by Hitachi High-Tech Science, calculating the adsorption rate based on the following formula.

$$\text{Adsorption rate (\%)} = (10-F)/10\times100$$

(Adsorption Rate for Chromium (Cr) with Blank Concentration of 80 ppm)

After adding 0.03 g of sample to a 50 mL-volume centrifuge tube, 30 mL of an aqueous potassium chromate solution with a chromium concentration of 80 ppm was added. The centrifuge tube was set in a shaker and shaken for 15 hours at a shaking speed of 160 rpm. The centrifuge tube was set in a centrifugal separator and centrifuged for 5 minutes at 10,000 g. The supernatant liquid was filtered through a membrane filter with a pore size of 0.2 μm. The chromium concentration G (ppm) of the obtained filtrate was measured using an SPS3500DD ICP emission spectrometer by Hitachi High-Tech Science, calculating the adsorption rate based on the following formula.

$$\text{Adsorption rate (\%)} = (80-G)/80\times100$$

(Adsorption Rate for Chromium (Cr) with Blank Concentration of 100 ppm)

After adding 0.03 g of sample to a 50 mL-volume centrifuge tube, 30 mL of an aqueous potassium chromate solution with a chromium concentration of 100 ppm was added. The centrifuge tube was set in a shaker and shaken for 15 hours at a shaking speed of 160 rpm. The centrifuge tube was set in a centrifugal separator and centrifuged for 5 minutes at 10,000 g. The supernatant liquid was filtered through a membrane filter with a pore size of 0.2 μm. The chromium concentration H (ppm) of the obtained filtrate was measured using an SPS3500DD ICP emission spectrometer by Hitachi High-Tech Science, calculating the adsorption rate based on the following formula.

$$\text{Adsorption rate (\%)} = (100-H)/100\times100$$

(Adsorption Rate for Phosphorus (P) with Blank Concentration of 20 ppm)

After adding 0.03 g of sample to a 50 mL-volume centrifuge tube, 30 mL of an aqueous sodium dihydrogen phosphate solution with a phosphorus concentration of 20 ppm was added. The centrifuge tube was set in a shaker and shaken for 15 hours at a shaking speed of 160 rpm. The centrifuge tube was set in a centrifugal separator and centrifuged for 5 minutes at 10,000 g. The supernatant liquid was filtered through a membrane filter with a pore size of 0.2 μm. The phosphorus concentration I (ppm) of the obtained filtrate was measured using an SPS3500DD ICP emission spectrometer by Hitachi High-Tech Science, calculating the adsorption rate based on the following formula.

$$\text{Adsorption rate } (\%) = (20 - I)/20 \times 100$$

(Adsorption Rate for Phosphorus (P) with Blank Concentration of 30 ppm)

After adding 0.03 g of sample to a 50 mL-volume centrifuge tube, 30 mL of an aqueous sodium dihydrogen phosphate solution with a phosphorus concentration of 30 ppm was added. The centrifuge tube was set in a shaker and shaken for 15 hours at a shaking speed of 160 rpm. The centrifuge tube was set in a centrifugal separator and centrifuged for 5 minutes at 10,000 g. The supernatant liquid was filtered through a membrane filter with a pore size of 0.2 μm. The phosphorus concentration J (ppm) of the obtained filtrate was measured using an SPS3500DD ICP emission spectrometer by Hitachi High-Tech Science, calculating the adsorption rate based on the following formula.

$$\text{Adsorption rate } (\%) = (30 - J)/30 \times 100$$

(Adsorption Rate for Phosphorus (P) with Blank Concentration of 40 ppm)

After adding 0.03 g of sample to a 50 mL-volume centrifuge tube, 30 mL of an aqueous sodium dihydrogen phosphate solution with a phosphorus concentration of 40 ppm was added. The centrifuge tube was set in a shaker and shaken for 15 hours at a shaking speed of 160 rpm. The centrifuge tube was set in a centrifugal separator and centrifuged for 5 minutes at 10,000 g. The supernatant liquid was filtered through a membrane filter with a pore size of 0.2 μm. The phosphorus concentration K (ppm) of the obtained filtrate was measured using an SPS3500DD ICP emission spectrometer by Hitachi High-Tech Science, calculating the adsorption rate based on the following formula.

$$\text{Adsorption rate } (\%) = (40 - K)/40 \times 100$$

Examples and Comparative Examples of the invention will now be described.

Example 1

In a 1 L volume reaction tank containing a small amount of water there were simultaneously added dropwise 201 mL of a 1.5 mol/L magnesium chloride aqueous solution, 134 mL of a 1.0 mob/L aluminum chloride aqueous solution, and a mixture of 257 mL of a 3.4 mol/L sodium hydroxide aqueous solution with 107 mL of a 0.75 mol/L sodium carbonate aqueous solution, while stirring, to obtain a reaction product. The pH during the reaction was 9.5. The obtained reaction product was washed with water and then dried overnight at 105° C. and pulverized. The resulting powder was burned under conditions with a temperature increase time of 1 hour, a holding temperature of 400° C., a holding time of 12 hours and a temperature decrease time of 1 hour, to obtain a sample for Example 1.

Example 2

A sample was obtained for Example 2 in the same manner as Example 1, except that burning was under conditions with a temperature increase time of 1.25 hours, a holding temperature of 500° C., a holding time of 2 hours and a temperature decrease time of 1.25 hours.

Example 3

A sample was obtained for Example 3 in the same manner as Example 1, except that burning was under conditions with a temperature increase time of 1.5 hours, a holding temperature of 600° C., a holding time of 2 hours and a temperature decrease time of 1.75 hours.

Example 4

A sample was obtained for Example 4 in the same manner as Example 1, except that burning was under conditions with a temperature increase time of 1.75 hours, a holding temperature of 700° C., a holding time of 2 hours and a temperature decrease time of 1.95 hours.

Example 5

A sample was obtained for Example 5 in the same manner as Example 1, except that burning was under conditions with a temperature increase time of 2 hours, a holding temperature of 800° C., a holding time of 6 hours and a temperature decrease time of 2.08 hours.

Example 6

A sample was obtained for Example 6 in the same manner as Example 1, except that burning was under conditions with a temperature increase time of 2 hours, a holding temperature of 800° C., a holding time of 0 hours and a temperature decrease time of 2.08 hours.

Example 7

A sample was obtained for Example 7 in the same manner as Example 1, except that burning was under conditions with a temperature increase time of 2 hours, a holding temperature of 800° C., a holding time of 2 hours and a temperature decrease time of 2.08 hours.

Example 8

A sample was obtained for Example 8 in the same manner as Example 1, except that burning was under conditions with a temperature increase time of 2.13 hours, a holding temperature of 850° C., a holding time of 2 hours and a temperature decrease time of 2.13 hours.

Comparative Example 1

A sample was obtained for Comparative Example 1 in the same manner as Example 1, except that burning was under conditions with a temperature increase time of 50 minutes, a holding temperature of 350° C., a holding time of 2 hours and a temperature decrease time of 0.75 hour.

Comparative Example 2

A sample was obtained for Comparative Example 2 in the same manner as Example 1, except that burning was under conditions with a temperature increase time of 2.25 hours, a holding temperature of 900° C., a holding time of 2 hours and a temperature decrease time of 2.2 hours.

The chemical formula was $Mg_{4.5}Al_2O_{7.5}$ for each of the samples of Examples 1 to 8 and Comparative Examples 1 and 2 obtained as described above.

Each of the samples of Examples 1 to 8 and Comparative Examples 1 and 2 was used for measurement of the powder properties (molar ratio and BET specific surface area) and the adsorption rate for each anion (blank concentrations, F: 10 ppm, B: 10 ppm, Cr: 80 ppm, P: 30 ppm). The results are shown in Table 1.

TABLE 1

| | Molar ratio | BET specific surface area ($m^2/g$) | Solid base content (mmol/g) | Adsorption rate (%) F 10 ppm | B 10 ppm | Cr 80 ppm | P 30 ppm |
|---|---|---|---|---|---|---|---|
| Example 1 | 4.5 | 252 | 4.17 | 97.1 | 92.9 | 95.5 | 99.8 |
| Example 2 | 4.5 | 227 | 5.08 | 98.0 | 92.9 | 99.4 | 99.8 |
| Example 3 | 4.5 | 205 | 5.92 | 97.9 | 96.0 | 99.1 | 99.8 |
| Example 4 | 4.5 | 190 | 7.08 | 97.8 | 95.6 | 99.5 | 99.8 |
| Example 5 | 4.5 | 168 | 3.83 | 96.6 | 94.3 | 99.5 | 99.8 |
| Example 6 | 4.5 | 198 | 4.63 | 98.1 | 95.9 | 99.8 | 99.8 |
| Example 7 | 4.5 | 170 | 4.97 | 96.8 | 92.0 | 98.9 | 99.8 |
| Example 8 | 4.5 | 155 | 4.71 | 95.5 | 92.2 | 96.7 | 99.1 |
| Comp. Example 1 | 4.5 | 103 | 2.06 | 37.7 | 13.0 | 19.3 | 62.1 |
| Comp. Example 2 | 4.5 | 133 | 3.32 | 88.6 | 75.5 | 64.4 | 98.2 |

The adsorption rate of each anion is considered to be satisfactory if the adsorption rate is 90% or greater for F: 10 ppm, 90% or greater for B: 10 ppm, 90% or greater for Cr: 80 ppm and 90% or greater for P: 30 ppm.

Example 9

In a 1 L volume reaction tank containing a small amount of water there were simultaneously added dropwise 228 mL of a 1.5 mol/L magnesium chloride aqueous solution, 114 mL of a 1.0 mol/L aluminum chloride aqueous solution, and a mixture of 268 mL of a 3.4 mol/L sodium hydroxide aqueous solution with 91 mL of a 0.75 mol/L sodium carbonate aqueous solution, while stirring, to obtain a reaction product. The pH during the reaction was 10.0. The obtained reaction product was washed with water and then dried overnight at 105° C. and pulverized. The resulting powder was burned under conditions with a temperature increase time of 1 hour, a holding temperature of 400° C., a holding time of 2 hours and a temperature decrease time of 4 hours, to obtain a sample for Example 9.

Example 10

A sample was obtained for Example 10 in the same manner as Example 9, except that burning was under conditions with a temperature increase time of 4 hours, a holding temperature of 400° C., a holding time of 2 hours and a temperature decrease time of 1 hour.

Example 11

A sample was obtained for Example 11 in the same manner as Example 9, except that burning was under conditions with a temperature increase time of 1 hour, a holding temperature of 400° C., a holding time of 2 hours and a temperature decrease time of 1 hour.

Example 12

A sample was obtained for Example 12 in the same manner as Example 9, except that burning was under conditions with a temperature increase time of 4 hours, a holding temperature of 400° C., a holding time of 2 hours and a temperature decrease time of 4 hours.

Example 13

A sample was obtained for Example 13 in the same manner as Example 9, except that burning was under conditions with a temperature increase time of 1 hour, a holding temperature of 400° C., a holding time of 12 hours and a temperature decrease time of 1 hour.

Example 14

A sample was obtained for Example 14 in the same manner as Example 9, except that burning was under conditions with a temperature increase time of 1.25 hours, a holding temperature of 500° C., a holding time of 2 hours and a temperature decrease time of 1.25 hours.

Example 15

A sample was obtained for Example 15 in the same manner as Example 9, except that burning was under conditions with a temperature increase time of 1.5 hours, a holding temperature of 600° C., a holding time of 2 hours and a temperature decrease time of 1.75 hours.

Example 16

A sample was obtained for Example 16 in the same manner as Example 9, except that burning was under conditions with a temperature increase time of 1.75 hours, a holding temperature of 700° C., a holding time of 2 hours and a temperature decrease time of 1.95 hours.

Example 17

A sample was obtained for Example 17 in the same manner as Example 9, except that burning was under conditions with a temperature increase time of 2 hours, a holding temperature of 800° C., a holding time of 6 hours and a temperature decrease time of 2.08 hours.

Example 18

A sample was obtained for Example 18 in the same manner as Example 9, except that burning was under conditions with a temperature increase time of 2 hours, a holding temperature of 800° C., a holding time of 0 hours and a temperature decrease time of 2.08 hours.

Example 19

A sample was obtained for Example 19 in the same manner as Example 9, except that burning was under conditions with a temperature increase time of 2 hours, a holding temperature of 800° C., a holding time of 2 hours and a temperature decrease time of 2.08 hours.

Example 20

A sample was obtained for Example 20 in the same manner as Example 9, except that burning was under conditions with a temperature increase time of 2.13 hours, a holding temperature of 850° C., a holding time of 2 hours and a temperature decrease time of 2.13 hours.

Comparative Example 3

A sample was obtained for Comparative Example 3 in the same manner as Example 9, except that burning was under conditions with a temperature increase time of 50 minutes, a holding temperature of 350° C., a holding time of 2 hours and a temperature decrease time of 0.75 hour.

Comparative Example 4

A sample was obtained for Comparative Example 4 in the same manner as Example 9, except that burning was under conditions with a temperature increase time of 2.25 hours, a holding temperature of 900° C., a holding time of 2 hours and a temperature decrease time of 2.2 hours.

The chemical formula was $Mg_6Al_2O_9$ for each of the samples of Examples 9 to 20 and Comparative Examples 3 and 4 obtained as described above.

Each of the samples of Examples 9 to 20 and Comparative Examples 3 and 4 was used for measurement of the powder properties (molar ratio and BET specific surface area) and the adsorption rate for each anion (blank concentrations, F: 10 ppm, B: 10 ppm, Cr: 80 ppm. P: 30 ppm). The results are shown in Table 2.

Example 21

In a 1 L volume reaction tank containing a small amount of water there were simultaneously added dropwise 252 mL of a 1.5 mol/L magnesium chloride aqueous solution, 94 mL of a 1.0 mol/L aluminum chloride aqueous solution, and a mixture of 278 mL of a 3.4 mol/L sodium hydroxide aqueous solution with 76 mL of a 0.75 mol/L sodium carbonate aqueous solution, while stirring, to obtain a reaction product. The pH during the reaction was 11.0. The obtained reaction product was washed with water and then dried overnight at 105° C. and pulverized. The resulting powder was burned under conditions with a temperature increase time of 1 hour, a holding temperature of 400° C., a holding time of 12 hours and a temperature decrease time of 1 hour, to obtain a sample for Example 21.

Example 22

A sample was obtained for Example 22 in the same manner as Example 21, except that burning was under conditions with a temperature increase time of 1.25 hours, a holding temperature of 500° C., a holding time of 2 hours and a temperature decrease time of 1.25 hours.

Example 23

A sample was obtained for Example 23 in the same manner as Example 21, except that burning was under conditions with a temperature increase time of 1.5 hours, a holding temperature of 600° C., a holding time of 2 hours and a temperature decrease time of 1.75 hours.

Example 24

A sample was obtained for Example 24 in the same manner as Example 21, except that burning was under conditions with a temperature increase time of 1.75 hours, a holding temperature of 700° C., a holding time of 2 hours and a temperature decrease time of 1.95 hours.

Comparative Example 5

A sample was obtained for Comparative Example 5 in the same manner as Example 21, except that burning was under

TABLE 2

| | Molar ratio | BET specific surface area ($m^2/g$) | Solid base content (mmol/g) | Adsorption rate (%) F 10 ppm | B 10 ppm | Cr 80 ppm | P 30 ppm |
|---|---|---|---|---|---|---|---|
| Example 9 | 6.0 | 222 | 3.74 | 98.5 | 93.6 | 95.3 | 99.8 |
| Example 10 | 6.0 | 225 | 3.76 | 98.9 | 93.4 | 95.1 | 99.8 |
| Example 11 | 6.0 | 224 | 3.85 | 99.0 | 94.4 | 93.2 | 99.9 |
| Example 12 | 6.0 | 210 | 3.90 | 98.7 | 91.6 | 97.8 | 98.8 |
| Example 13 | 6.0 | 254 | 4.45 | 99.7 | 95.3 | 99.5 | 99.8 |
| Example 14 | 6.0 | 218 | 4.34 | 99.0 | 95.3 | 99.8 | 99.8 |
| Example 15 | 6.0 | 190 | 5.72 | 98.2 | 97.1 | 98.2 | 99.8 |
| Example 16 | 6.0 | 175 | 8.73 | 98.3 | 96.4 | 99.2 | 99.9 |
| Example 17 | 6.0 | 157 | 3.93 | 96.6 | 94.0 | 98.0 | 99.7 |
| Example 18 | 6.0 | 184 | 4.48 | 98.8 | 96.6 | 99.8 | 99.8 |
| Example 19 | 6.0 | 159 | 4.70 | 96.9 | 92.1 | 98.7 | 99.9 |
| Example 20 | 6.0 | 150 | 4.06 | 95.1 | 90.2 | 91.4 | 99.8 |
| Comp. Example 3 | 6.0 | 89 | 1.56 | 50.1 | 14.2 | 20.2 | 61.5 |
| Comp. Example 4 | 6.0 | 129 | 3.69 | 89.1 | 82.8 | 60.0 | 99.7 |

conditions with a temperature increase time of 50 minutes, a holding temperature of 350° C., a holding time of 2 hours and a temperature decrease time of 0.75 hour.

Comparative Example 6

A sample was obtained for Comparative Example 6 in the same manner as Example 21, except that burning was under conditions with a temperature increase time of 1 hour, a holding temperature of 400° C., a holding time of 2 hours and a temperature decrease time of 4 hours.

Comparative Example 7

A sample was obtained for Comparative Example 7 in the same manner as Example 21, except that burning was under conditions with a temperature increase time of 1 hour, a holding temperature of 400° C., a holding time of 2 hours and a temperature decrease time of 1 hour.

Comparative Example 8

A sample was obtained for Comparative Example 8 in the same manner as Example 21, except that burning was under conditions with a temperature increase time of 2 hours, a holding temperature of 800° C., a holding time of 6 hours and a temperature decrease time of 2.08 hours.

Comparative Example 9

A sample was obtained for Comparative Example 9 in the same manner as Example 21, except that burning was under conditions with a temperature increase time of 2.13 hours, a holding temperature of 850° C., a holding time of 2 hours and a temperature decrease time of 2.13 hours.

Comparative Example 10

A sample was obtained for Comparative Example 10 in the same manner as Example 21, except that burning was under conditions with a temperature increase time of 2.25 hours, a holding temperature of 900° C., a holding time of 2 hours and a temperature decrease time of 2.2 hours.

The chemical formula was $Mg_8Al_2O_{11}$ for each of the samples of Examples 21 to 24 and Comparative Examples 5 to 10 obtained as described above.

Each of the samples of Examples 21 to 24 and Comparative Examples 5 to 10 was used for measurement of the powder properties (molar ratio and BET specific surface area) and the adsorption rate for each anion (blank concentrations, F: 10 ppm, B: 10 ppm, Cr: 80 ppm, P: 30 ppm). The results are shown in Table 3.

TABLE 3

| | Molar ratio | BET specific surface area ($m^2/g$) | Solid base content (mmol/g) | Adsorption rate (%) F 10 ppm | B 10 ppm | Cr 80 ppm | P 30 ppm |
|---|---|---|---|---|---|---|---|
| Example 21 | 8.0 | 246 | 4.18 | 98.9 | 92.3 | 97.1 | 99.8 |
| Example 22 | 8.0 | 201 | 4.42 | 99.0 | 93.7 | 99.9 | 99.8 |
| Example 23 | 8.0 | 167 | 7.18 | 98.9 | 95.1 | 99.9 | 99.8 |
| Example 24 | 8.0 | 150 | 6.96 | 99.0 | 93.4 | 95.1 | 99.8 |
| Comp. Example 5 | 8.0 | 29 | 0.66 | 68.5 | 14.2 | 16.5 | 58.4 |
| Comp. Example 6 | 8.0 | 174 | 3.17 | 96.7 | 59.9 | 95.7 | 98.8 |
| Comp. Example 7 | 8.0 | 208 | 3.18 | 97.4 | 67.9 | 73.4 | 99.2 |
| Comp. Example 8 | 8.0 | 129 | 2.65 | 96.4 | 92.4 | 97.6 | 87.5 |
| Comp. Example 9 | 8.0 | 119 | 2.28 | 94.3 | 83.4 | 76.6 | 93.2 |
| Comp. Example 10 | 8.0 | 74 | 2.46 | 89.7 | 40.7 | 38.2 | 66.9 |

Each of the samples of Examples 3, 4, 7, 15, 16, 23 and 24 and Comparative Examples 2, 4 and 10 were used for further measurement of the adsorption rate for each anion with different blank concentrations (F: 10 ppm, B: 10 ppm. Cr: 80 ppm, P: 30 ppm). The results are shown in Table 4.

TABLE 4

| | Molar ratio | BET specific surface area ($m^2/g$) | Solid base content (mmol/g) | Adsorption rate (%) F 50 ppm | Cr 100 ppm | P 20 ppm | P 40 ppm |
|---|---|---|---|---|---|---|---|
| Example 3 | 4.5 | 205 | 5.92 | 82.0 | 98.6 | 99.5 | 99.7 |
| Example 4 | 4.5 | 190 | 7.08 | 85.4 | 99.2 | 99.6 | 99.7 |
| Example 7 | 4.5 | 170 | 4.97 | 82.2 | 98.2 | 99.5 | 81.5 |
| Comp. Example 2 | 4.5 | 133 | 3.32 | 60.7 | 51.6 | 98.7 | 64.7 |
| Example 15 | 6.0 | 190 | 5.72 | 92.0 | 97.2 | 99.5 | 99.8 |
| Example 16 | 6.0 | 175 | 8.73 | 91.6 | 98.8 | 99.5 | 99.1 |
| Comp. Example 4 | 6.0 | 129 | 3.69 | 63.6 | 54.9 | 95.8 | 55.7 |
| Example 23 | 8.0 | 167 | 7.18 | 91.8 | 90.9 | 99.5 | 99.6 |
| Example 24 | 8.0 | 150 | 6.96 | 91.2 | 84.8 | 99.5 | 91.8 |
| Comp. Example 10 | 8.0 | 74 | 2.46 | 53.1 | 25.5 | 71.0 | 36.4 |

The adsorption rate of each anion is indicated as being satisfactory if the adsorption rate is 80% or greater for F: 50 ppm, 80% or greater for Cr: 100 ppm, 90% or greater for P: 20 ppm and 80% or greater for P: 40 ppm.

As shown in Table 1 to Table 4, the samples of Examples 1 to 24 of the invention all allowed removal of the four different anions, each at a high adsorption rate. All of the samples were also able to efficiently adsorb and remove not only monatomic anions but also polyatomic oxoanions and transition metal oxoanions.

INDUSTRIAL APPLICABILITY

The composite metal oxide of the invention can be suitably used as an adsorbent for adsorbent liquids such as water or gases, as well as in products in a wide variety of fields including liquid purifying materials, filtration devices (such as packed columns), composite fibers and resin stabilizers.

The invention claimed is:

1. A composite metal oxide represented by formula (1), wherein a solid base content is 3.70 mmol/g or greater $$(Mg_{1-x}Al_x)O_{1+x/2} \quad (1)$$

wherein in formula (1), x is a number satisfying $0.18 \leq x \leq 0.45$.

2. The composite metal oxide according to claim 1, wherein a BET specific surface area is in a range of 150 $m^2/g$ to 350 $m^2/g$.

3. A mixture comprising the composite metal oxide according to claim 1, and a layered double hydroxide.

4. The mixture according to claim 3, wherein the layered double hydroxide is represented by formula (2)

$$[Mg_{1-x}Al_x(OH)_2]^{x+}\left[(A^{n-})_{x/n} \cdot mH_2O\right] \quad (2)$$

wherein in formula (2), $A^{n-}$ represents an anion selected from a group consisting of $CO_3^{2-}$ and OH, n represents 1 or 2, x is a number satisfying $0.18 \leq x \leq 0.45$, and m is a number satisfying $0 \leq m < 1$.

5. The mixture according to claim 3, wherein a mixing ratio of the composite metal oxide and layered double hydroxide is in a range of 99.99:0.01 to 50:50, as mass ratio.

6. An adsorbent comprising the composite metal oxide according to claim 1.

7. A method of treating a liquid that includes contacting the liquid with the composite metal oxide according to claim 1.

* * * * *